United States Patent
Baldemair et al.

(10) Patent No.: US 10,791,568 B2
(45) Date of Patent: Sep. 29, 2020

(54) ULTRA-PROTECTED SCHEDULING

(71) Applicant: Telefonaktiebolaget LM Ericsson (publ), Stockholm (SA)

(72) Inventors: Robert Baldemair, Solna (SE); Johan Axnäs, Solna (SE)

(73) Assignee: Telefonaktiebolaget LM ERicsson (publ), Stockholm (SE)

( * ) Notice: Subject to any disclaimer, the term of this patent is extended or adjusted under 35 U.S.C. 154(b) by 0 days.

(21) Appl. No.: 16/341,267

(22) PCT Filed: Oct. 27, 2017

(86) PCT No.: PCT/IB2017/056695
§ 371 (c)(1),
(2) Date: Apr. 11, 2019

(87) PCT Pub. No.: WO2018/078583
PCT Pub. Date: May 3, 2018

(65) Prior Publication Data
US 2020/0128568 A1    Apr. 23, 2020

Related U.S. Application Data (60) Provisional application No. 62/414,441, filed on Oct. 28, 2016, provisional application No. 62/417,809, filed on Nov. 4, 2016.

(51) Int. Cl.
*H04W 72/12*   (2009.01)
*H04W 72/14*   (2009.01)

(52) U.S. Cl.
CPC ... *H04W 72/1242* (2013.01); *H04W 72/1268* (2013.01); *H04W 72/14* (2013.01)

(58) Field of Classification Search
None
See application file for complete search history.

(56) References Cited

U.S. PATENT DOCUMENTS

2016/0112992 A1    4/2016 Bhushan et al.
2016/0269047 A1    9/2016 Jiang et al.
(Continued)

OTHER PUBLICATIONS

Author Unknown, "Technical Specification Group Radio Access Network; Study on Scenarios and Requirements or Next Generation Access Technologies; (Release 14)," Technical Report 38.913, Version 1.0.0, 3GPP Organizational Partners, Oct. 2016, 39 pages.
(Continued)

*Primary Examiner* — Anh Ngoc M Nguyen
(74) *Attorney, Agent, or Firm* — Withrow & Terranova, PLLC (57) ABSTRACT

Systems and methods for ultra-protected scheduling are disclosed. In some embodiments, a method of operation of a first node includes determining a part of radio resources on which some traffic types can only be scheduled using ultra-protected scheduling messages. The method also includes scheduling a second node to use the part of the radio resources using an ultra-protected scheduling message. In some embodiments, the part of the radio resources is used for Ultra Reliable Communication (URC) and scheduling the second node to use the part of the radio resources for non-URC transmissions. In this way, there may be reduced risk that any node incorrectly transmits in the part of the radio resources and interferes with traffic on the part.

18 Claims, 6 Drawing Sheets

(56) References Cited

U.S. PATENT DOCUMENTS

2017/0290009 A1* 10/2017 Feng .......................... H04L 5/22
2018/0035446 A1*  2/2018 Li .............................. H04L 5/14
2018/0254794 A1*  9/2018 Lee ...................... H04J 11/0069

OTHER PUBLICATIONS

Huawei, et al., "R1-1608843: Overview of URLLC support in NR," Third Generation Partnership Project (3GPP), TSG RAN WG1 Meeting #86bis, Oct. 10-14, 2016, 7 pages, Lisbon, Portugal.
Zte, "R1-1608959: Fast scheduling and transmission for NR," Third Generation Partnership Project (3GPP), TSG RAN WG1 Meeting #86bis, Oct. 10-14, 2016, 7 pages, Lisbon, Portugal.
International Search Report and Written Opinion for International Patent Application No. PCT/IB2017/056695, dated Feb. 5, 2018, 18 pages.

* cited by examiner

FIG. 7

ULTRA-PROTECTED SCHEDULING

RELATED APPLICATIONS

This application is a 35 U.S.C. § 371 national phase filing of International Application No. PCT/IB2017/056695, filed Oct. 27, 2017, which claims the benefit of provisional patent application Ser. No. 62/414,441, filed Oct. 28, 2016 and provisional patent application Ser. No. 62/417,809, filed Nov. 4, 2016, the disclosures of which are hereby incorporated herein by reference in their entireties.

TECHNICAL FIELD

The present disclosure relates to scheduling ultra-reliable communication.

BACKGROUND

Fifth Generation (5G) systems are supposed to support multiple types of services using a common Radio Access Network (RAN): enhanced Mobile Broadband (eMBB), massive Machine Type Communication (mMTC), Ultra-Reliable Communication (URC), and Ultra-Reliable and Low Latency Communication (URLLC). These services require different Qualities of Service (QoS): delay, data rate, and packet loss rate:
  URC requires high reliability;
  URLLC requires low delay and/or high reliability;
  mMTC typically requires long battery lifetime but does not require low delay or high data rate, often combined with small infrequent packets;
  eMBB requires high data rate. Delay can be strict but typically less strict than in URLLC.
URC means a transmission is guaranteed to go through with extremely high probability, typically within a limited, rather small, time interval (i.e., there might not be room for re-transmissions). In order to obtain this goal, there should not be undue interference or congestion on the resources used for URC. This can be achieved by having URC operate in a separate system on a separate frequency band compared to other, less reliable, types of transmissions (e.g. normal mobile broadband).

SUMMARY

Systems and methods for ultra-protected scheduling are disclosed. In some embodiments, a method of operation of a first node includes determining a part of radio resources on which some traffic types can only be scheduled using ultra-protected scheduling messages. The method also includes scheduling a second node to use the part of the radio resources using an ultra-protected scheduling message. In some embodiments, the part of the radio resources is used for Ultra Reliable Communication (URC) and scheduling the second node to use the part of the radio resources for non-URC transmissions. In this way, there may be reduced risk that any node incorrectly transmits in the part of the radio resources and interferes with traffic on the part.

In some embodiments, using the ultra-protected scheduling message includes transmitting the ultra-protected scheduling message with a Cyclic Redundancy Check (CRC) with a larger number of bits than a regular scheduling assignment message. In some embodiments, using the ultra-protected scheduling message includes transmitting a plurality of regular scheduling assignment messages.

In some embodiments, scheduling the second node includes scheduling the second node to transmit an uplink transmission. In some embodiments, scheduling the second node includes scheduling the second node to transmit a side-link transmission to another second node.

In some embodiments, the method also includes transmitting to the second node an indication of the part of the radio resources on which some traffic types can only be scheduled using ultra-protected scheduling messages.

In some embodiments, a first node includes at least one processor and memory. The memory includes instructions executable by the at least one processor whereby the first node is operable to determine a part of the radio resources on which some traffic types can only be scheduled using ultra-protected scheduling messages; and schedule a second node to use the part of the radio resources using an ultra-protected scheduling message.

In some embodiments, a first node includes a resource determination module operable to determine a part of the radio resources on which some traffic types can only be scheduled using ultra-protected scheduling messages; and a scheduling module operable to schedule a second node to use the part of the radio resources using an ultra-protected scheduling message.

In some embodiments, a method of operation of a second node includes determining a part of the radio resources on which some traffic types can only be scheduled using ultra-protected scheduling messages. The method also includes receiving, from a first node, an ultra-protected scheduling message to schedule the second node to use the part of the radio resources.

In some embodiments, the part of the radio resources is used for URC. In some embodiments, scheduling the second node includes scheduling the second node to use the part of the radio resources for non-URC transmissions.

In some embodiments, receiving the ultra-protected scheduling message includes receiving the ultra-protected scheduling message with a CRC with a larger number of bits than a regular scheduling assignment message. In some embodiments, receiving the ultra-protected scheduling message includes receiving a plurality of regular scheduling assignment messages.

In some embodiments, scheduling includes scheduling the second node to transmit an uplink transmission. In some embodiments, scheduling the second node includes scheduling the second node to transmit a side-link transmission to another second node.

In some embodiments, determining the part of the radio resources includes receiving, from the first node, an indication of the part of the radio resources on which some traffic types can only be scheduled using ultra-protected scheduling messages.

In some embodiments, the method also includes receiving, from the first node, a scheduling message to schedule the second node to use the part of the radio resources and, in response to determining that the scheduling message is not an ultra-protected scheduling message, ignoring the scheduling message.

In some embodiments, a second node includes at least one transceiver and circuitry operable to determine a part of radio resources on which some traffic types can only be scheduled using ultra-protected scheduling messages; and receive an ultra-protected scheduling message to schedule the second node to use the part of the radio resources.

In some embodiments, a second node includes a resource determination module operable to determine a part of radio resources on which some traffic types can only be scheduled using ultra-protected scheduling messages; and a scheduling module operable to receive an ultra-protected scheduling message to schedule the second node to use the part of the radio resources.

In some embodiments, a method of operation of a second node includes determining an allowed part of radio resources on which traffic can be scheduled for the second node. The method also includes receiving, from a first node, a scheduling message to schedule the second node to use resources that are not part of the allowed part of the radio resources and ignoring the scheduling message.

In some embodiments, the allowed part of the radio resources is used for non-URC transmissions. In some embodiments, the resources that are not part of the allowed part of the radio resources are used for URC transmissions.

In some embodiments, the scheduling message includes scheduling the second node to transmit an uplink transmission. In some embodiments, the scheduling message includes scheduling the second node to transmit a side-link transmission to another second node.

In some embodiments, determining the allowed part of radio resources on which traffic can be scheduled for the second node includes receiving an indication of the allowed part of the radio resources from the first node. In some embodiments, the allowed part of radio resources on which traffic can be scheduled for the second node is predefined.

In some embodiments, the first node is a radio access node. In some embodiments, the second node is a User Equipment (UE). In some embodiments, the second node is a Transmission and Reception Point (TRP).

In some embodiments, the uplink carrier bandwidth is split into separate regions, one for non-URC transmissions, such as Enhanced Mobile Broadband (eMBB) transmissions, and one for URC transmissions, $B_{URC}$. In some embodiments, an eMBB terminal is only allowed to transmit within the eMBB region of the carrier. Any uplink grant pointing to resources outside of the eMBB region is discarded by the eMBB terminal. In this way, there may be reduced risk that an eMBB terminal (or other UE) incorrectly transmits in the $B_{URC}$ part of the frequency band (or other radio resources) and interferes with the URC.

In some embodiments, the idea is to have a part of the frequency band (or other radio resources) for URC, $B_{URC}$, where
1. All URC traffic is scheduled,
2. Non-URC traffic can also be scheduled, but only using special ultra-protected scheduling messages (e.g. with extra high CRC protection).

In this way, there may be reduced risk that any UE incorrectly transmits in the $B_{URC}$ part of the frequency band (or other radio resources) and interferes with the URC. Different methods for sending ultra-reliable scheduling messages are discussed in the detailed description.

The full system bandwidth can be used for normal communication (i.e. not URC) without risk of causing interference to URC.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Ultra-Reliable Communication (URC) means a transmission is guaranteed to go through with extremely high probability, typically within a limited, rather small, time interval (i.e., there might not be room for re-transmissions).

Figure 1:
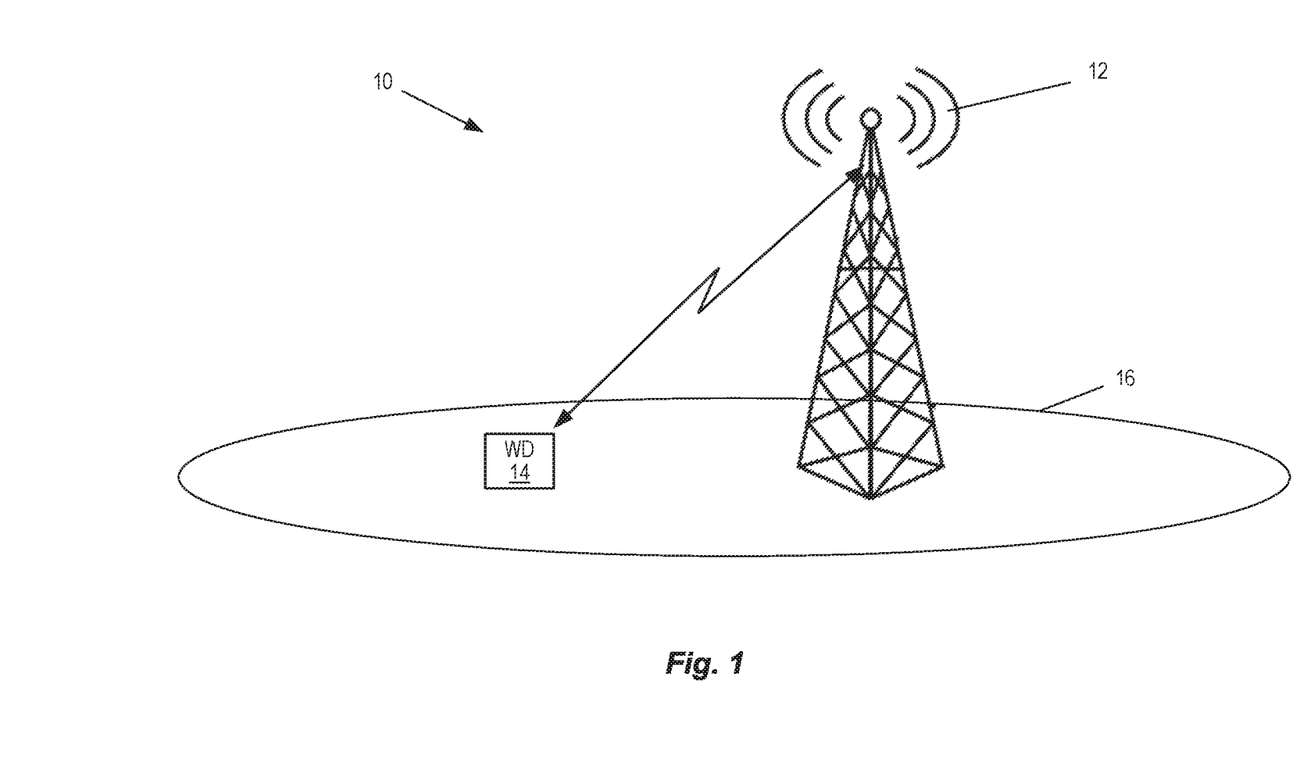
FIG. 1 illustrates a wireless communication system according to some embodiments.

In this regard, FIG. 1 illustrates one example of a wireless system 10 (e.g., a cellular communications system) in which embodiments of the present disclosure may be implemented. The wireless system 10 includes a first node 12, which in this example is a radio access node. However, the first node 12 is not limited to a radio access node and can be another device such as a general radio node allowing communication within a radio network, including a wireless device as described below. The radio access node 12 provides wireless access to other nodes such as wireless devices or other access nodes, such as a second node 14, within a coverage area 16 (e.g., cell) of the radio access node 12. In some embodiments, the second node 14 is a Long Term Evolution User Equipment (LTE UE). Note that the term "UE" is used herein in its broad sense to mean any wireless device. As such, the terms "wireless device" and "UE" are used interchangeably herein. In other embodiments, the second node 14 may be a Transmission and Reception Point (TRP) (e.g., base stations, access nodes, etc.), especially one that uses self-backhauling to wirelessly communicate to another node, or other network node allowing communication with a network.

In order to guarantee high reliability of transmissions, unexpected interference should be prevented from disturbing the communication. This can be achieved by having URC operate in a separate system on a separate frequency band compared to other, less reliable types of transmissions (e.g. normal mobile broadband). However, for practical/cost reasons, it may be desirable to use the same system (e.g. New Radio (NR)) with the same transmit and receive units for both URC and the less reliable transmissions. In some embodiments, a part of the frequency band is still reserved for only URC ($B_{URC}$) in order to avoid any unexpected interference from the less reliable transmissions. The $B_{URC}$ is sometimes referred to herein as the "URC Region." Also, the resources that are not reserved for URC are sometimes referred to herein as the "Enhanced Mobile Broadband (eMBB) Region." In some embodiments, $B_{URC}$ is a separate frequency band (as opposed to a part of the same frequency band). Unexpected interference could especially be a risk from UEs 14, over which the network has less control than TRPs. One reason for this is a lack of reliable control signaling over the air. For instance, a UE 14 may falsely detect a scheduling grant message that leads to collision with URC.

NR is supposed to serve a wide range of use cases, including eMBB and Ultra-Reliable and Low Latency Communication (URLLC), among others. It should also be possible to multiplex traffic types with different Quality of Service (QoS) requirement in the same carrier. Some embodiments discussed herein include aspects that arise when serving Ultra Reliability Communication (URC) and eMBB in the same carrier.

There are two error cases:

1) A UE is scheduled but fails to detect its transmission and

2) A UE is not scheduled but falsely detects a matching Physical Downlink Control Channel (PDCCH).

If either of these two error cases happens for an eMBB terminal, this will not impact URC ongoing on the same carrier.

To guarantee that a Downlink (DL) URC transmission is received with sufficiently high reliability, one must ensure that both PDCCH (in case of dynamic signaling) and Physical Downlink Shared Channel (PDSCH) are transmitted reliably. This can be done using sufficiently robust Modulations and Coding Schemes (MCSs), coding, and a high degree of diversity.

The second error case above (A UE is not scheduled but falsely detects a matching PDCCH) can, however, not be avoided by robust transmissions. In LTE, a UE tries to detect control channels over several possible hypotheses, and if it finds a candidate where the Cyclic Redundancy Check (CRC) checks the UE, it considers the PDCCH addressed to itself. If no PDCCH has been transmitted on the decoded resources, the likelihood the UE falsely interprets noise, as PDCCH depends on the CRC length. For a CRC with length N the false alarm rate can be approximated by $P_{false}=2^{-N}$; for N=16 the false alarm rate becomes $P_{false}=1.5E-5$. In LTE, the UE searches for matching PDCCHs over several different candidate positions as well as over several differently scrambled CRCs; if the UE tries in total M different decodings, the false alarm rate increases to roughly be a factor M (assuming small $P_{false}$). If the "decoded" PDCCH contains a DL assignment, the UE tries to decode the data and will fail. Depending on whether a Hybrid Automatic Repeat Request (HARQ) is applied and the details of the HARQ protocol, this wrongly decoded PDSCH may corrupt the UE softbuffer. If, for a subsequent true transmission, the softbuffer content is combined with the new transmission, this likely leads to a decoding failure. If a UE stops monitoring for DL assignments after it has received one, it might miss a true DL assignment.

Whether these issues pose a true problem for URC depends very much on details of PDCCH design and HARQ operation and needs further study. A simple remedy—if required—could be an increased CRC for URC DL assignments and/or specifying that a UE cannot stop decoding DL assignments early.

Also in uplink, the above two error cases can occur. Again, robustness of true Uplink (UL) transmissions can be increased by using robust MCS, code rate, and diversity for the UL grant as well as the UL transmission.

The effect of a falsely detected UL grant is two-fold: if a UE stops searching for UL grants after it has received one UL grant, it might miss a true UL grant. The transmission based on a wrongly detected UL grant may also disturb other UL transmissions.

The problem of a UE missing a true UL grant due to a falsely detected UL grant can be mitigated by increased CRC of UL grants and/or specifying that a UE cannot stop decoding UL grants early.

A UL transmission based on a wrongly detected UL grant can happen for both eMBB and URC terminals, and the victim transmission can in both cases be either an eMBB UL transmission (not different from today) or an URC uplink transmission with high reliability demands. A CRC of length N=16 provides false detection probability of $P_{false}=1.5E-5$ for a single decoding attempt and even higher probabilities if UE tries to decode multiple candidates. This error rate is too high given the requirements of $10^{-5}$ for reliability (i.e., only one error in ten thousand). Downlink Control Information (DCI) with URC UL grants could apply longer CRC—this might be needed for other reasons as well—to mitigate this error case. The same solution could of course also be applied to DCIs with eMBB UL grants. A drawback of such a solution is that control channel load would increase with larger CRC for all eMBB UL grants. Furthermore, from UE implementation perspective it might be preferable to have the same CRC for UL grants and DL assignments increasing control channel load even further.

Figure 2:
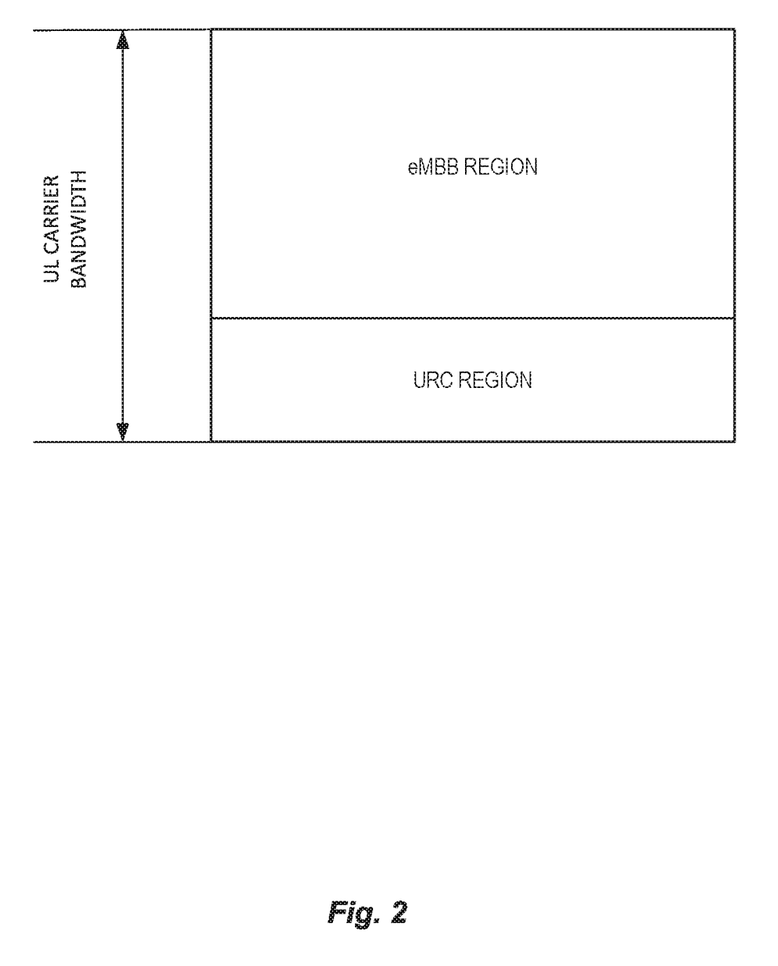
FIG. 2 illustrates an uplink carrier bandwidth separated into two regions according to some embodiments of the present disclosure.

Another possible solution would be to split the UL carrier bandwidth into two separate regions, one for eMBB and one for URC. An eMBB terminal is only allowed to transmit within the eMBB region of the carrier. Any UL grant pointing to resources outside the eMBB region is discarded. In this embodiment, a regular CRC can be used for eMBB UL grants since any wrongly detected UL grant pointing into the URC region is discarded. FIG. 2 illustrates an uplink carrier bandwidth separated into two regions according to some embodiments of the present disclosure.

A drawback of this solution is that the carrier might be underutilized if e.g., more eMBB resources would be needed than reserved on the eMBB share and the URC share is underutilized. This could be mitigated by allowing eMBB terminals to use the URC share as well if scheduled with DCI UL grants providing for low false detections. Low false detections could be achieved by a longer CRC (but as previously mentioned this might not be the preferred solution for eMBB terminals). Another possibility is to schedule an eMBB terminal twice with the same UL grant, and only if the eMBB terminal receives both UL grants can it transmit on resources in the URC region. The likelihood that an eMBB terminal falsely confuses two noise signatures as the same UL grant is very low.

Reserving a part of the frequency band for only URC can be a waste of radio resources, particularly if there is only intermittent URC traffic in the system while there is high load/demand of non-URC communications (e.g. mobile broadband). As such, systems and methods are disclosed herein to allow for non-URC traffic to be scheduled in a part of the frequency band where all URC traffic is scheduled. In some embodiments, this is accomplished by allowing non-URC traffic to be scheduled, but only using ultra-protected scheduling messages. As used herein, ultra-protected scheduling messages are messages with a lower probability of being misunderstood. That is, the chances of a UE 14 or TRP broadcasting in the $B_{URC}$ when it should not is reduced compared to conventional scheduling techniques.

Systems and methods for ultra-protected scheduling are disclosed. In some embodiments, a method of operation of a first node includes determining a part of radio resources on which some traffic types can only be scheduled using ultra-protected scheduling messages. The method also includes scheduling a second node to use the part of the radio resources using an ultra-protected scheduling message. In some embodiments, the part of the radio resources is used for URC and scheduling the second node to use the part of the radio resources for non-URC transmissions. In this way, there may be reduced risk that any node incorrectly transmits on the part of the radio resources and interferes with traffic on the part.

The frequency range of $B_{URC}$ could be predefined or signaled, e.g., using Radio Resource Control (RRC) or broadcast. A UE 14 (or TRP) would only be allowed to transmit in the $B_{URC}$ if it receives a special ultra-protected scheduling message pointing to $B_{URC}$. In some embodiments, a regular scheduling message pointing to the $B_{URC}$ would be considered as a misdetection (accidental CRC match in spite of incorrectly decoded message) and should be ignored. There would then be minimal risk that any UE incorrectly transmits in the $B_{URC}$ and interferes with the URC.

Figure 3:
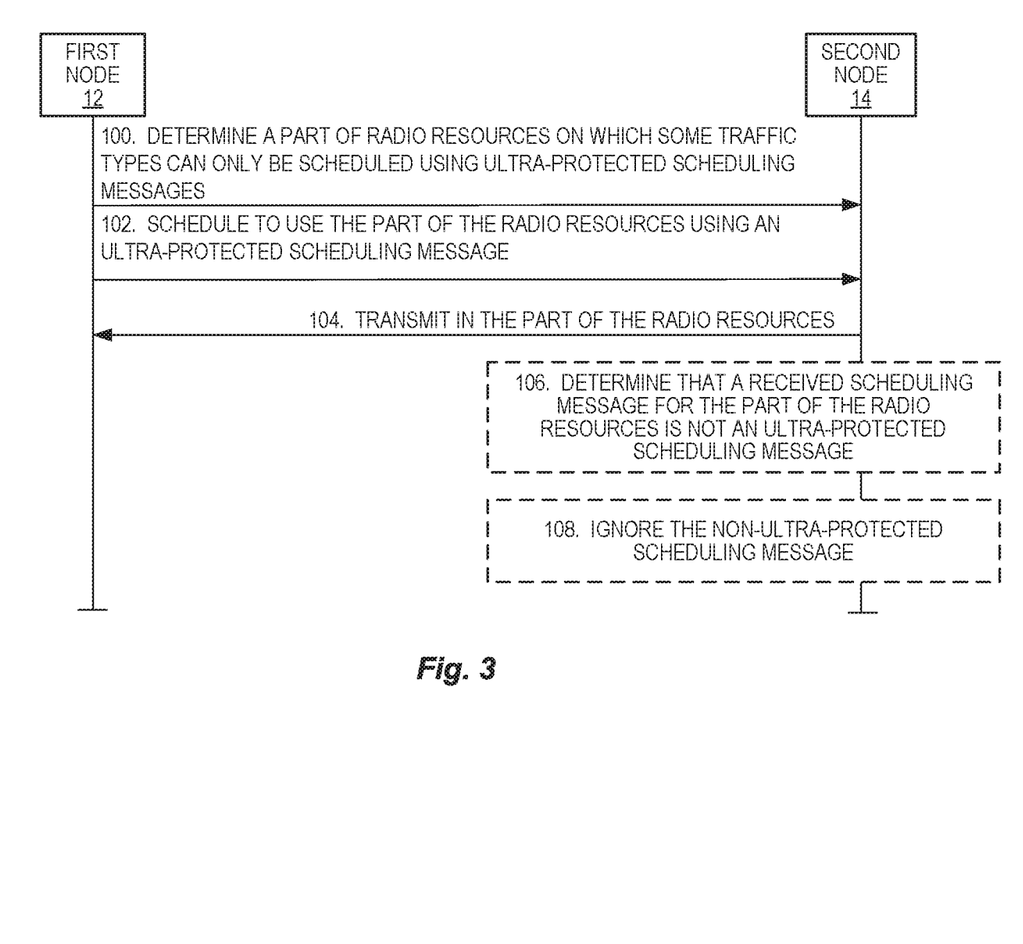
FIG. 3 illustrates a procedure for using ultra-protected scheduling according to some embodiments of the present disclosure.

FIG. 3 illustrates a procedure for using ultra-protected scheduling according to some embodiments of the present disclosure. First, a part of radio resources on which some traffic types can only be scheduled using ultra-protected scheduling messages is determined (step 100). This may include a determination by the first node 12, a determination by the second node 14 (e.g., an LTE UE, a TRP, etc.), or some communication between the two. For instance, the first node 12 may determine the part of the radio resources and signal an indication of the part of the radio resources to the second node 14. In some embodiments, the part of the radio resources may be specified in a standard or in some other way such that the first node 12 and the second node 14 both know the part of the radio resources. As discussed elsewhere, the part of the resources may be a part of the frequency resources, time resources, or a combination of both.

As shown in FIG. 3, the node 12 schedules the second node 14 to use the part of the resources using an ultra-protected scheduling message (step 102). Some embodiments of the ultra-protected scheduling message are discussed in more detail below. In some embodiments, this scheduling is for a non-URC transmission.

The second node 14 then transmits in the part of the radio resources (step 104). This transmission allows the part of the resources to be used for other transmissions when the specific type of transmissions (e.g., URC) are not needed and will not be interfered with. Again, in order to reduce the probability that the second node 14 makes this transmission when it is not supposed to, the ultra-protected scheduling message is such that the probability of an incorrect reception/decoding of the message is reduced.

There are multiple options for designing an ultra-protected scheduling message. One option is to introduce a new PDCCH DCI (control-channel message format) for ultra-protected scheduling assignment messages. The new DCI format could have a CRC with a larger number of bits than the regular scheduling assignment messages. The longer CRC would reduce the risk that a UE 14 misinterprets some other signal (or noise) as a scheduling assignment. A terminal may check a CRC with different scrambling masks (different CRC masks) and if any of the different scrambling matches, the terminal considers the scheduling as being intended for it. In some embodiments, for ultra-protected scheduling grants, the number of different scrambling masks should be minimized. The new DCI could additionally possibly utilize a more robust channel coding. This could also be used to reduce the risk of a misinterpretation, which could lead to unwanted interference on the $B_{URC}$.

Another option is to reuse the regular DCI formats for scheduling assignments but specify that a UE 14 may only transmit in the $B_{URC}$ if it receives multiple (e.g., two or more) scheduling assignment messages pointing to exactly the same radio resources. Some embodiments may additionally require that the two scheduling assignment messages arrive within a limited time interval (e.g., in the same slot or within 5*ms*) in order to be valid.

The new DCI option has the advantage that it allows for tailoring the protection/robustness to the exact needed reliability. The multiple DCI option has the advantage that it does not require the introduction of new DCI formats. That is, the impact on current standards is reduced. Furthermore, a UE 14 only needs to monitor DCI types with one CRC length.

Although the majority of examples included herein are directed to scheduling of transmissions from UEs 14 (either in the UL or in side-links to other UEs 14), the current disclosure is not limited thereto. In some embodiments, the same techniques can apply to scheduling messages regarding DL that a network controller sends to a TRP, especially in a network with self-backhauling.

Also, although the majority of examples included herein are directed to a $B_{URC}$ that is separated in the frequency domain, the current disclosure is not limited thereto. In some embodiments, the same techniques can apply if separation between URC and other types of transmissions are not (only) in the frequency domain, but rather (only or also) in the time domain.

Returning to FIG. 3, the second node 14 may optionally determine that a received scheduling message for the part of the resources is not an ultra-protected scheduling message (step 106). In some embodiments, this may be that the scheduling did not include the sufficient CRC certainty to qualify as an ultra-protected scheduling message, or the second node 14 may not have received the correct number of scheduling messages within the correct amount of time.

In response to this determination, the second node 14 ignores the non-ultra-protected scheduling message (step 108). If the scheduling message really was erroneous, then the second node 14 made the correct decision and avoided causing interference on the part of the resources when it should not have. On the other hand, if the second node 14 really was allowed to transmit in the part of the resources at that time, then the part of the resources were not used as efficiently as it could have been in this instance. However, the error of ignoring a legitimate scheduling is less costly than the error of transmitting in the part of the resources incorrectly, potentially causing interference that was unexpected.

The balancing of these two types of errors can be used in determining how low the probability of an error should be for ultra-protected scheduling messages. As discussed above, this may be tuned by requiring a specific number of CRC bits or a specific number of DCI messages, for example. These systems and methods allow for a part of the resources to be reserved for some reason such as URC while still allowing efficient use of the resources by other types of traffic.

In some embodiments:
  Network: Defines a part B of the radio resources on which
    some traffic types can only be scheduled using special
    scheduling messages, and perform scheduling using
    such messages.

UE: Transmits in accordance with special scheduling messages, and ignores any regular scheduling messages requiring transmission in B.

In some embodiments:

"Some traffic types" are non-URC.

The "special scheduling messages" have a lower probability to be falsely detected (e.g. have longer CRC, must be received multiple times).

The "part B of the radio resources" is a (contiguous or noncontiguous) part of the frequency band and/or special time slots.

Different options for special scheduling messages: (i) new DCI format or (ii) two [or more] messages pointing to the same resources.

All URC traffic is scheduled in the "part of the radio resources."

The scheduling message is for a UE transmission.

Figure 4:
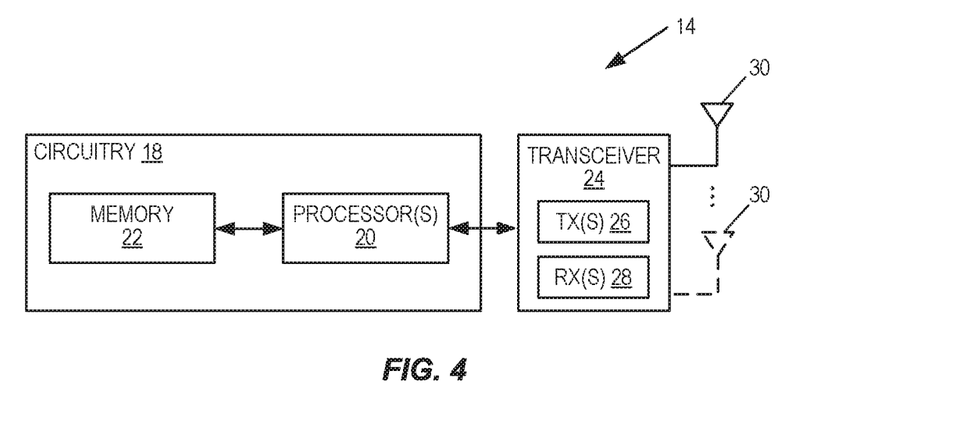
FIGS. 4 and 5 illustrate example embodiments of a wireless device according to some embodiments of the present disclosure.
Figure 5:
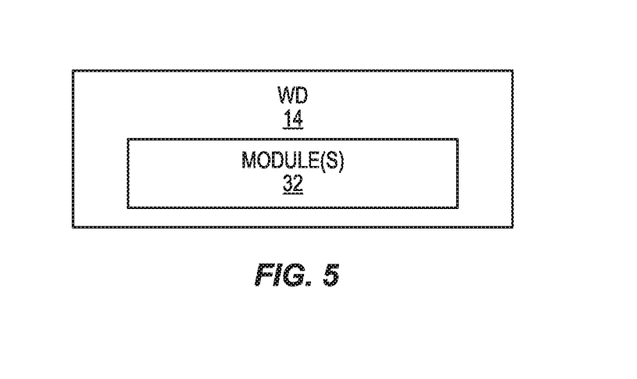

FIGS. 4 and 5 illustrate example embodiments of a second node 14 such as a wireless device 14 according to some embodiments of the present disclosure. FIG. 4 is a schematic block diagram of the wireless device 14 (e.g., a UE 14) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 5 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., UE 14) described herein.

Figure 6:
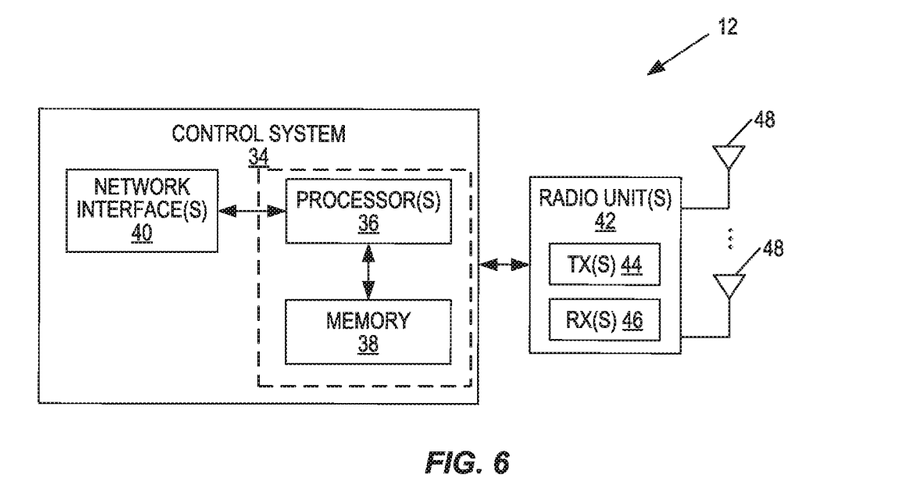
FIGS. 6 through 8 illustrate example embodiments of a radio network node according to some embodiments of the present disclosure.
Figure 7:
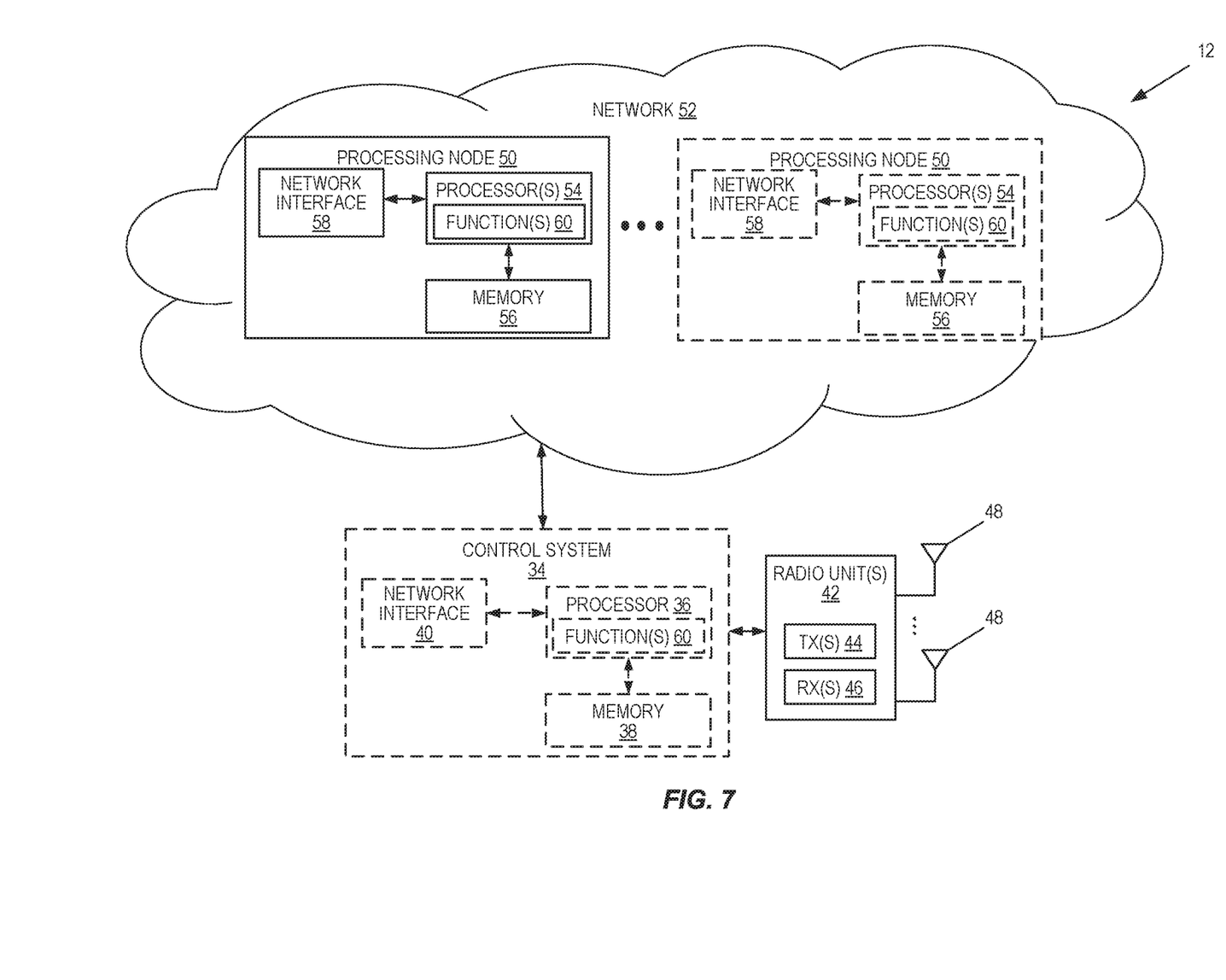
Figure 8:
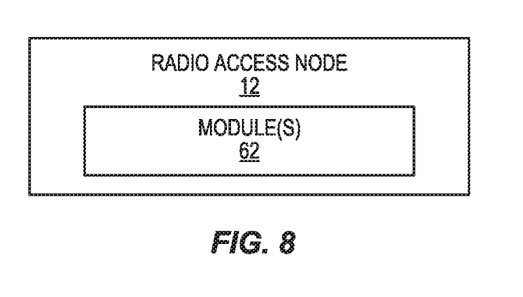

FIGS. 6 through 8 illustrate example embodiments of a radio network node according to some embodiments of the present disclosure. FIG. 6 is a schematic block diagram of the node 12 according to some embodiments of the present disclosure. Other types of network nodes may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes the network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

FIG. 7 is a schematic block diagram that illustrates a virtualized embodiment of the radio access node 12 according to some embodiments of the present disclosure. Other types of network nodes may have similar architectures (particularly with respect to including processor(s), memory, and a network interface).

As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 6. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 12 described herein are implemented at the one or more processing nodes 50 or distributed across the control system 34 (if present) and the one or more processing nodes 50 in any desired manner. In some particular embodiments, some or all of the functions 60 of the radio access node 12 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 50 via an appropriate network interface(s).

In some embodiments, a computer program including instructions which, when executed by at least one processor, causes the at least one processor to carry out the functionality of the radio access node 12 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 8 is a schematic block diagram of the radio access node 12 according to some other embodiments of the present disclosure. The radio access node 12 includes one or more modules 62, each of which is implemented in software. The module(s) 62 provide the functionality of the radio access node 12 described herein.

At least some of the following abbreviations may be used in this disclosure. If there is an inconsistency between abbreviations, preference should be given to how it is used above. If listed multiple times below, the first listing should be preferred over any subsequent listing(s).

5G Fifth Generation
ASIC Application Specific Integrated Circuit
CPU Central Processing Unit
CRC Cyclic Redundancy Check
DCI Downlink Control Information
DL Downlink
eMBB Enhanced Mobile Broadband
FPGA Field Programmable Gate Array
HARQ Hybrid Automatic Repeat Request
LTE Long Term Evolution
MCS Modulation and Coding Scheme
mMTC massive Machine Type Communication
NR New Radio
PDCCH Physical Downlink Control Channel
PDSCH Physical Downlink Shared Channel
QoS Quality of Service
RAN Radio Access Network
TRP Transmission and Reception Point
UE User Equipment
UL Uplink
URC Ultra-Reliable Communication
URLLC Ultra-Reliable and Low Latency Communication Those skilled in the art will recognize improvements and modifications to the embodiments of the present disclosure. All such improvements and modifications are considered within the scope of the concepts disclosed herein.

What is claimed is:

1. A method of operation of a second node comprising:
determining a part of radio resources on which some traffic types can only be scheduled using ultra-protected scheduling messages;
receiving, from a first node an ultra-protected scheduling message to schedule the second node to use the part of the radio resources;
receiving, from the first node, a scheduling message to schedule the second node to use the part of the radio resources; and
in response to determining that the scheduling message is not an ultra-protected scheduling message, ignoring the scheduling message.

2. The method of claim 1 wherein the part of the radio resources is used for Ultra Reliable Communication (URC).

3. The method of claim 1 wherein scheduling the second node comprises scheduling the second node to use the part of the radio resources for non-Ultra Reliable Communication (URC) transmissions.

4. The method of claim 1 wherein receiving the ultra-protected scheduling message comprises receiving the ultra-protected scheduling message with a Cyclic Redundancy Check (CRC) with a larger number of bits than a regular scheduling assignment message.

5. The method of claim 1 wherein receiving the ultra-protected scheduling message comprises receiving a plurality of regular scheduling assignment messages.

6. The method of claim 1 wherein scheduling the second node comprises scheduling the second node to transmit an uplink transmission.

7. The method of claim 1 wherein scheduling the second node comprises scheduling the second node to transmit a side-link transmission to another second node.

8. The method of claim 1 wherein the first node is a radio access node and the second node is either a User Equipment (UE) or a Transmission and Reception Point (TRP).

9. The method of claim 1 wherein determining the part of the radio resources comprises receiving, from the first node an indication of the part of the radio resources on which some traffic types can only be scheduled using ultra-protected scheduling messages.

10. A second node comprising:
at least one transceiver; and
circuitry operable to:
determine a part of radio resources on which some traffic types can only be scheduled using ultra-protected scheduling messages; and
receive, from a first node, an ultra-protected scheduling message to schedule the second node to use the part of the radio resources;
receive, from the first node, a scheduling message to schedule the second node to use the part of the radio resources; and
in response to determining that the scheduling message is not an ultra-protected scheduling message, ignore the scheduling message.

11. The second node of claim 10 wherein the part of the radio resources is used for Ultra Reliable Communication (URC).

12. The second node of claim 10 wherein scheduling the second node comprises the circuitry being further operable to schedule the second node to use the part of the radio resources for non-Ultra Reliable Communication (URC) transmissions.

13. The second node of claim 10 wherein receiving the ultra-protected scheduling message comprises the circuitry being further operable to receive the ultra-protected scheduling message with a Cyclic Redundancy Check (CRC) with a larger number of bits than a regular scheduling assignment message.

14. The second node of claim 10 wherein receiving the ultra-protected scheduling message comprises the circuitry being further operable to receive a plurality of regular scheduling assignment messages.

15. The second node of claim 10 wherein scheduling the second node comprises the circuitry being further operable to scheduling the second node to transmit an uplink transmission.

16. The second node of claim 10 wherein scheduling the second node comprises the circuitry being further operable to schedule the second node to transmit a side-link transmission to another second node.

17. The second node of claim 10 wherein the second node is either a User Equipment (UE) or a Transmission and Reception Point (TRP).

18. The second node of claim 10 wherein determining the part of the radio resources comprises the circuitry being further operable to receive, from the first node an indication of the part of the radio resources on which some traffic types can only be scheduled using ultra-protected scheduling messages.

* * * * *